United States Patent [19]

Shook

[11] Patent Number: 5,048,358
[45] Date of Patent: Sep. 17, 1991

[54] ROTARY PHASED RADIAL THRUST VARIABLE DRIVE TRANSMISSION

[75] Inventor: William B. Shook, Bremen, Ohio

[73] Assignee: Thurston, Inc., Columbus, Ohio

[21] Appl. No.: 533,026

[22] Filed: Jun. 4, 1990

[51] Int. Cl.⁵ ............................................. F16H 29/14
[52] U.S. Cl. ........................................... 74/112; 74/117
[58] Field of Search ................ 74/112, 156, 159, 117, 74/118, 119

[56] References Cited

U.S. PATENT DOCUMENTS

| | | | |
|---|---|---|---|
| 987,539 | 3/1911 | Bell | 74/112 |
| 1,979,723 | 11/1934 | Armitage et al. | 74/112 |
| 2,028,577 | 1/1936 | Vincenzoni | 74/112 |
| 3,929,025 | 12/1975 | Perry | 74/217 B |
| 3,987,682 | 10/1976 | Roantree | 74/117 |
| 4,116,083 | 9/1978 | Gogins | 74/393 |
| 4,164,153 | 8/1979 | Moritsch et al. | 74/217 B |
| 4,194,407 | 3/1980 | Gogins | 74/117 |
| 4,299,581 | 11/1981 | Korosue | 74/117 X |
| 4,560,182 | 12/1985 | Yamaguchi | 280/257 |
| 4,608,035 | 8/1986 | Reader | 474/148 |
| 4,666,172 | 5/1987 | Hartmann | 280/238 |
| 4,697,469 | 10/1987 | Takamiya et al. | 74/117 |
| 4,715,246 | 12/1987 | Hartmann | 74/594.2 |
| 4,741,546 | 5/1988 | Reswick | 280/236 |
| 4,750,376 | 6/1988 | Walker | 74/125.5 |

FOREIGN PATENT DOCUMENTS

| | | | |
|---|---|---|---|
| 1259664 | 1/1968 | Fed. Rep. of Germany | 74/112 |
| 121960 | 6/1948 | Sweden | 74/112 |

Primary Examiner—Leslie A. Braun
Assistant Examiner—Scott Anchell
Attorney, Agent, or Firm—William V. Miller; Sidney W. Millard

[57] ABSTRACT

A rotary phased radial thrust variable drive transmission which is lcoated between an input driving member, such as the pedal-driven sprocket of a bicycle, and an output driven member, such as the hub of a bicycle wheel which are mounted for relative rotation on a common axis, such as the axle of the rear wheel of a bicycle. The transmisison includes radial thrust linkages which are carried by the input driving member for cooperating with a surrounding cam ring assembly having a normally fixed cam profile providing a torsional thrust on the output driven member to cause rotation thereof. The cam ring assembly is selectively adjustable to vary its profile.

24 Claims, 5 Drawing Sheets

ROTARY PHASED RADIAL THRUST VARIABLE DRIVE TRANSMISSION

FIELD OF THE INVENTION

This invention deals with a rotary phased radial thrust variable drive transmission. It is useful in transmitting torsion from an input driving rotating circular member to an output driven circular member when mounted between such members on a common axis with them. In the following description it will be disclosed as being applicable to a bicycle as a multi-speed transmission for transmitting torque from a pedal driven sprocket on the rear wheel axle of a bicycle to a hub of the wheel on that axle, being located between the sprocket and hub on the axle. However, although this invention is described as providing for the transmission of torsional power from the pedal action of the bicyclist to the driven wheel of the bicycle, its utilization is in no way limited to such an application.

BACKGROUND OF THE INVENTION AND PRIOR ART

As is well known, multi-speed bicycles are in popular demand at the present time and various types are available. One of the most popular models is one having gear clusters on both the front sprocket and rear wheels. Derailleurs are provided in cooperation with these gear clusters for shifting the pedal driven sprocket chain into engagement with the selected sprockets to obtain the desired speeds of the bicycle. This is not a smooth operation and is noisy and sometimes, if not done properly, may result in displacement of the chain from the sprockets or damage to the chain, sprockets or derailleur or dangerous operation of the bicycle. Another prior art model has several gears incorporated in the hub of the rear wheel and means for shifting to selected gears. It is difficult to reach those gears for service and requires an expert mechanic to disassemble the hub for service if needed. In any case there are a finite number of gears available in the prior art and the numbers have been increasing over the years. Where a few years ago 10 speeds were very popular, now the market has 12, 14, 16 and even 18 speed bikes. Market demand says more is better.

SUMMARY OF THE INVENTION

As indicated, the transmission of this invention may be applied to a bicycle to transmit torque from a pedal driven sprocket on the rear wheel axle of a bicycle to a hub on the axle. It is mounted concentrically on the axle between the sprocket and the hub. The torsional transfer between the sprocket and the wheel hub is accomplished through a number of hinged linkages angularly disposed around the sprocket. Each linkage is composed of two links hinged together at their adjacent inner ends. The outer end of one of the links is pivoted to the sprocket for radial swinging movement and the outer end of the other hinged link carries a ratcheting pawl for radially engaging a mating surface on the wheel hub. At the hinge of each linkage is a cam-engaging roller which is capable of following the contour of a surrounding cam of a cam unit. This cam unit is held normally in a non-rotative fixed position relative to the wheel axle and is in the form of an assembly comprising a ring concentric with the axle and having an inner cam edge consisting of successive cam undulations with which the link rollers are adapted to engage. Each linkage is biased to force its rollers to follow the contour of the surrounding cam edge. The undulations provide roller-receiving indentations or recesses in the form of notches successively around the cam edge. The design of the cam edge is such that the number of roller-receiving undulations is not an even multiple of the roller-carrying linkages, (multiple −1) or (multiple +1). The roller movements are phased so that rotation of the sprocket causes successive incremental unlike positioning of the rollers. Thus, angular displacement of the sprocket about the axle results in the transmission of torque to the hub by the circumferential force exerted thereon as a result of the rollers following the contour of the cam edge. A relatively small angular rotation of the sprocket is capable of shifting the effective driving pawl through the full 360° cycle, depending entirely upon the design details of the cam edge contour over which the rollers are forced to follow. For purposes of this disclosure, that relationship is described as the "phasing" of the linkages. A means is provided for adjusting the cam edge contour to, in effect, change the shapes and sizes of the undulations so as to result in different contours or profiles of the cam edge to be followed by the rollers. The circumferential motion of a driving pawl on the hub is a function of the radial motion of its roller, so a change in that radial motion as a result of cam rotation will accordingly change the effective gearing ratio of the transmission.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
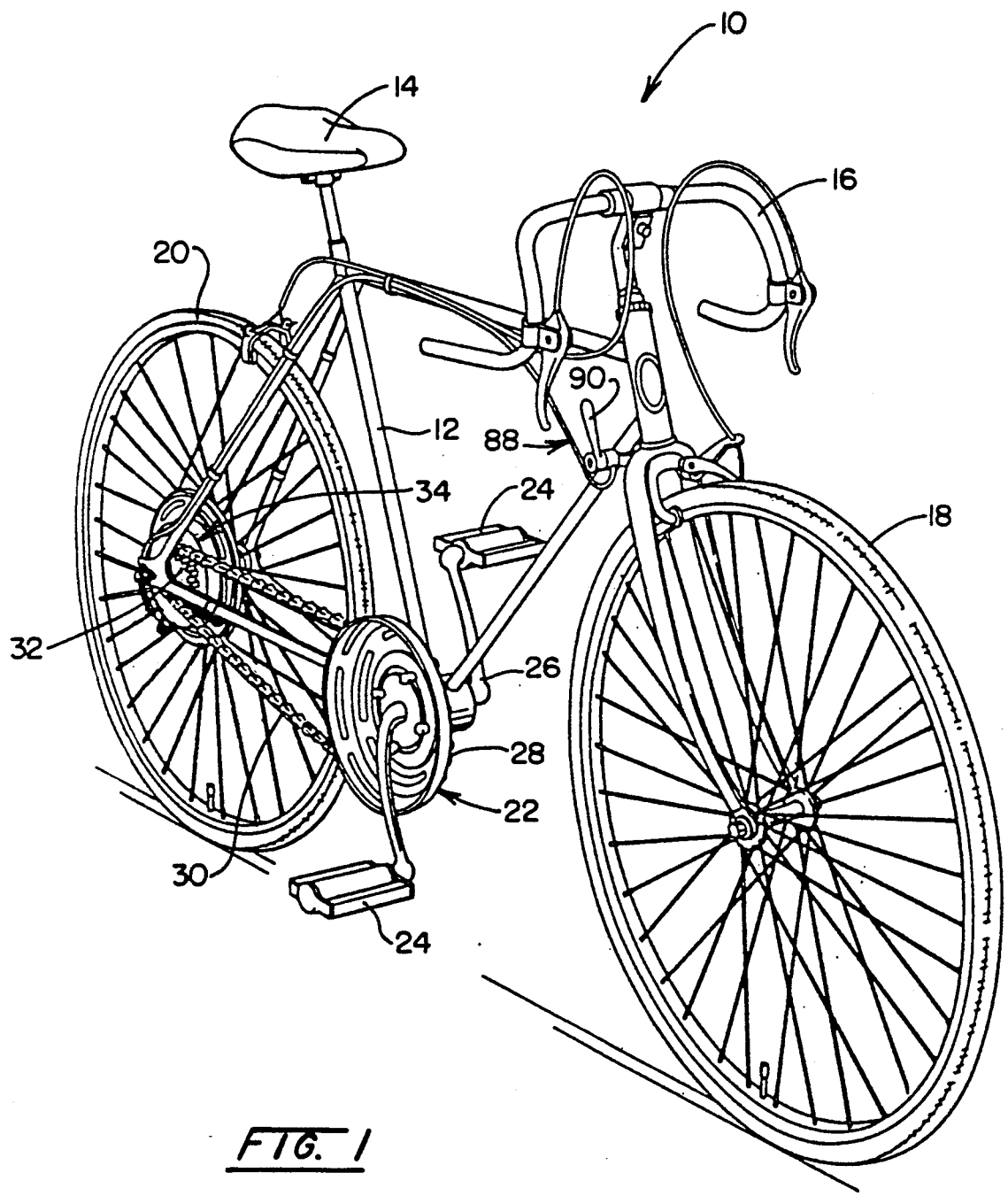
FIG. 1 is a perspective view showing a bicycle in which the transmission of this invention is embodied.

With specific reference to the drawings and particularly to FIG. 1 an example of a bicycle 10 to which this invention is applied is shown but as indicated before this is merely for illustrative purposes as the transmission is capable of many other applications. The bicycle is shown as having a frame 12 which carries a seat 14 and handle bars 16. At the front of the frame a front wheel 18 is mounted and at its rear a rear wheel 20 is mounted. Power is transferred to the rear wheel through a driving chain system which is a typical fixed-length system as used on ordinary coaster brake cycles or on track racing bicycles. This chain system includes a front crank assembly 22 having pedals 24, cranks 26 and a sprocket 28. A chain 30 connects the crank assembly 22 to a sprocket 32 on the rear wheel 20. This sprocket 32 has connected to it the variable ratio transmission 34 of this invention which replaces the five-sprocket assembly typical of ten-speed gearing with a derailleur on conventional bicycles.

Figure 3:
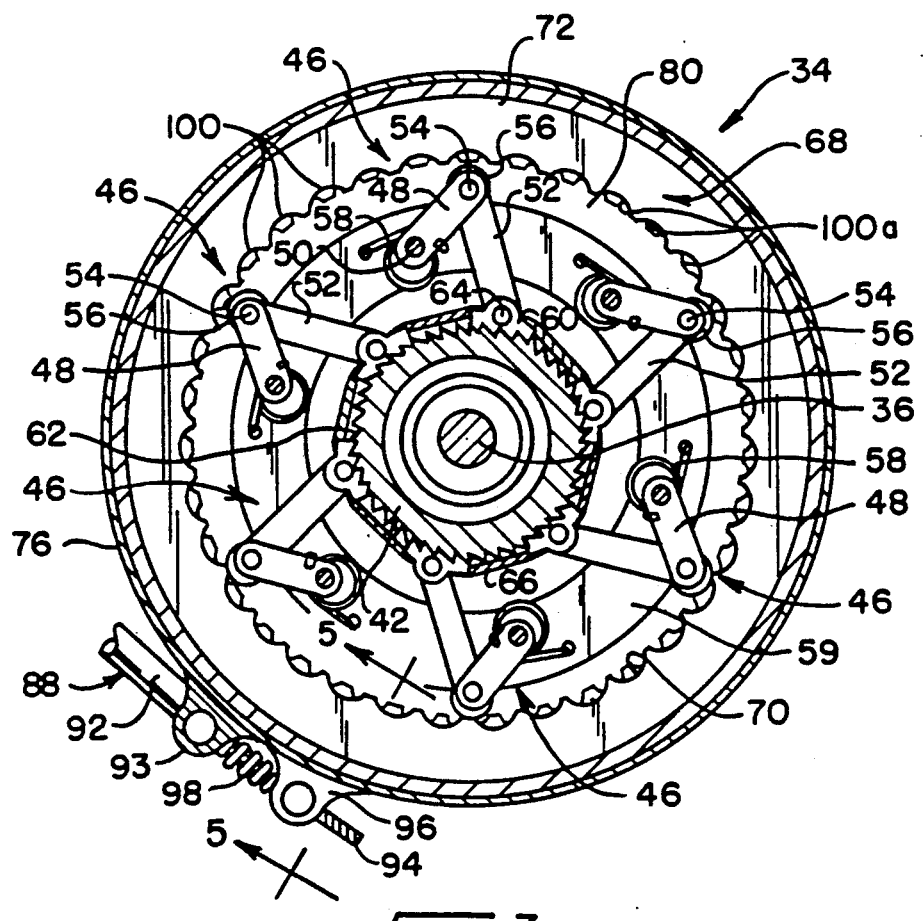
FIG. 3 is a transverse sectional view taken along line 3—3 of FIG. 4.
Figure 4:
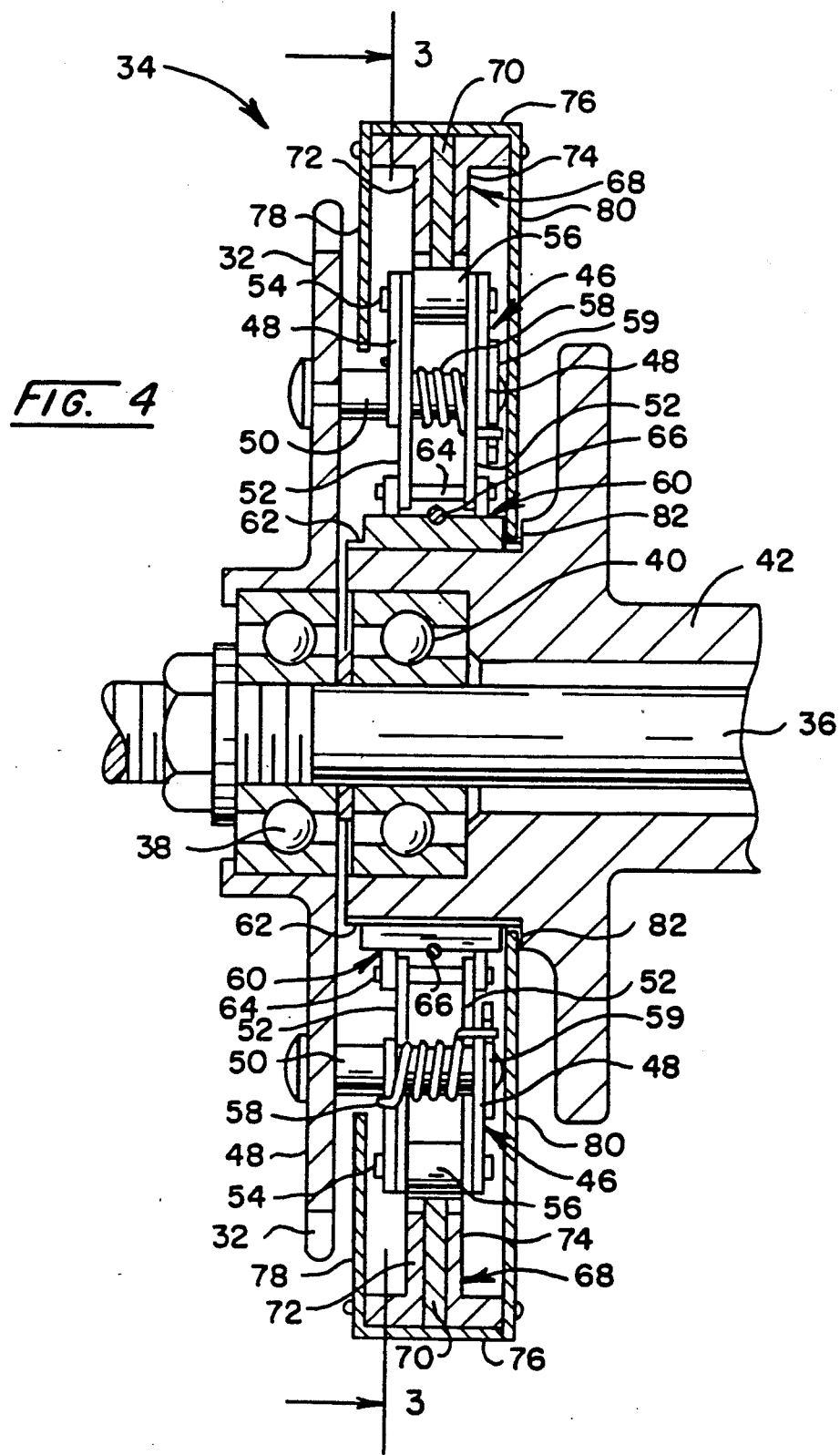
FIG. 4 is an enlarged axial sectional view taken along line 4—4 of FIG. 2.

The sprocket 32 is rotatably carried by the rear wheel axle 36 (FIG. 4) by means of a bearing 38. Directly adjacent the bearing 38 on the axle 36 is a bearing 40 which rotatably supports the wheel hub 42. Thus, the transmission 34 is located between the sprocket 32 and the hub 42 for connecting the sprocket 32 and hub 42 at variable selected speeds. The connection between the sprocket and hub includes a plurality of hinged linkages 46 disposed at angularly spaced positions on the sprocket 32 at the inner side thereof. These linkages are provided in a selected number, six being shown as an example. However, the number is not limited as long as it is properly related to an actuating cam unit comprising assembly 68 in a manner to be described. Each of the linkages 46 consists of a bifurcated mounting link 48 pivoted to the inner face of the sprocket 32 by an inwardly-extending pin 50 and a hinged bifurcated link 52 hinged to the outer end of the link 48 by a hinge pin 54. The link 48 may be termed a sprocket connecting link and the link 52 a ratchet pawl thrust link. At the hinge pin a cam-follower roller 56 is carried. Associated with the hinge pin 50 is a spring 58 and spring retaining ring 59 which biases the link 48 with the roller outwardly so that the roller 56 is urged into contact with the surrounding cam assembly 68. Thus, the links 48 and 52 are hinged in V-form with the roller 56 at the vertex. The radially inner end of the link 52 is provided with a pawl 60 formed with a ratchet engaging tooth which, when its linkage is biased as indicated, will engage with ratchet teeth 62 formed on the circumference of the hub 42. It will be noted that the pawl tooth extends transversely to the oppositely directed ratchet teeth on the hub circumference. This pawl 60 is pivotally carried by a pin 64 on the bifurcated end of the link 52 and is biased into engagement with a mating surface in the form of ratchet teeth on the hub 42 by a spring 66. With this arrangement, each of the linkages 46 has its roller 56 engaged with the cam assembly 68 and its pawl 60 engaged with the ratchet teeth of the hub 42. Those teeth are so formed that a thrust on the pawl 60 will rotate the hub in a clockwise or forward direction (FIG. 3).

The cam unit in the form of assembly 68 surrounds the hub 42 and is concentric therewith. This assembly (FIG. 4) consists of a central cam ring 70 disposed between a pair of cam rings 72 and 74. The cam rings 72-74 and cam ring 70 are relatively rotatably adjustable. They are disposed within a transmission housing which includes a ring plate 76 that carries inwardly-extending flange rings 78 and 80. The ring 78 extends inwardly closely adjacent the inner face of the sprocket 3 and serves as a dirt cover. It extends substantially to the link pivots 50. The ring 80 extends inwardly at the opposite side of the housing into an annular groove 82 in the hub 42 and serves as a dirt cover. The cam ring 70 is rotatable within the overlapping cam rings 72 and 74. The ring 80 is anchored to the frame 12 of the bicycle by a bracket 83 (FIG. 2) which has its rear end secured thereto by a screw 84 and its forward end connected to the frame 12 by a clamp 86. Thus the cam rings 72 and 74 are non-rotatably secured to the frame 12.

Figure 5:
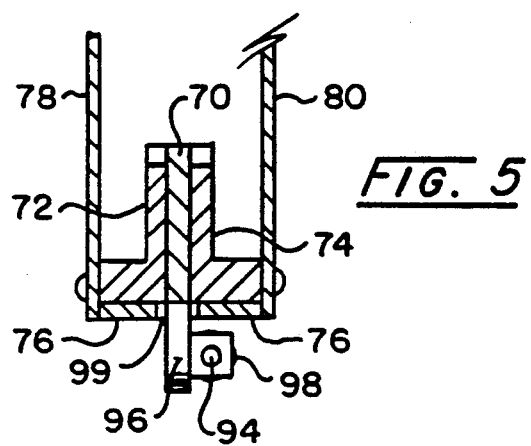
FIG. 5 is a sectional view taken along line 5—5 of FIG. 3 showing cam assembly adjusting means.

Means is provided for rotatably adjusting the cam ring 70 within the overlapping or masking cam rings 72 and 74. As will be explained later, this will adjust the actuating cam profile to vary the mechanical ratio of the transmission. This adjustment is accomplished with an actuating cable unit 88 which extends from a shifting lever 90 located adjacent the handlebars 16 to the transmission 34 at the rear wheel 20. At the transmission (FIG. 3) this cable has its tubular housing 92 connected to a tab 93 and the cable itself 94 to a tab 96. Between the tabs 93 and 96 is a compression spring 98 which biases the tabs apart. The tab 93 is attached to the ring plate 76 and the tab 96 is carried by the cam 70 (FIG. 5) and extends radially outwardly through a slot 99 in the ring plate 76. Actuation of the lever 90 causes the cable 94 to pull the tab 96 towards the tab 93 to rotate the cam ring 70 as described. This will rotate the cam 70 relative to the cam rings 72 and 74 to vary the effective cam profile of the cam assembly 68 as will be described more in detail later. The shift lever 90 has means (not shown) for holding it in a selected position as it is pulled back to select the speed ratio of the transmission. As it is pushed forward to its original position, the spring 98 will spread the tabs 93 and 96 to rotate cam ring 70 back to its original position.

Figure 6:
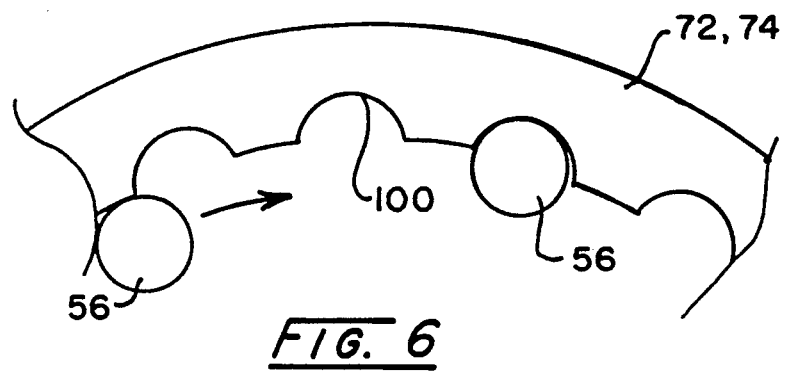
FIG. 6 is a schematic view showing the two parts of the cam assembly aligned.
Figure 7:
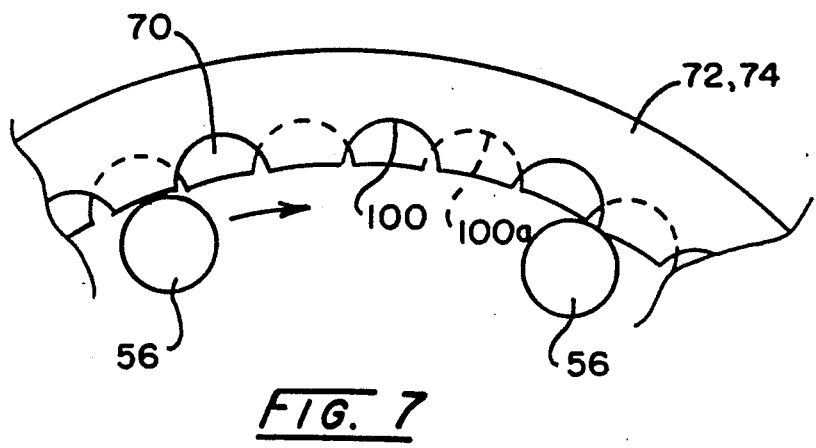
FIG. 7 is a similar view showing the two parts of the cam assembly not aligned.

The profiles of all the cam 70, 72 and 74 are shown identical and the cam rings are originally aligned but as indicated, are relatively adjustable to vary the effective profile of the cam assembly and thus vary the speed ratio of the transmission. However, the profile of cam ring 70 may differ from that of the other cam rings 72 and 74 but be complementary thereto to obtain any desired shape of recesses 100 by relative adjustment. As previously indicated, each cam ring has the cam profile in its inner edge and this edge is made up of a series of successive undulations. These undulations provide a series of roller-receiving recesses or notches indicated at 100 in the cam rings 72 and 74 and at 100a in the cam ring 70. These recesses may be of any selected shape such as angular or curved but are preferably curved such as semicircular to obtain smoother operation as the cam rollers enter and leave them. In this example they are shown as semi-circular and each of a diameter slightly greater than that of the cam-following rollers. It will be apparent, however, that the cam-followers need not necessarily be in the form of rollers but preferably have curved cam-engaging surfaces. The result of the rotation of cam ring 70 relative to the cam rings 72-74 is illustrated by a comparison of FIG. 6 with FIG. 7. In FIG. 6, the cam rings 70, 72 and 74 are aligned although the cam ring 70 cannot be seen. In this case the recesses 100 of the cam rings are completely open to receive the circular rollers 56 as shown. Rotation adjustment of cam ring 70 relative to cam rings 72-74 will result in gradually changing the shape and size of the roller-receiving recesses until they are completely closed as indicated in FIG. 7.

Figure 2:
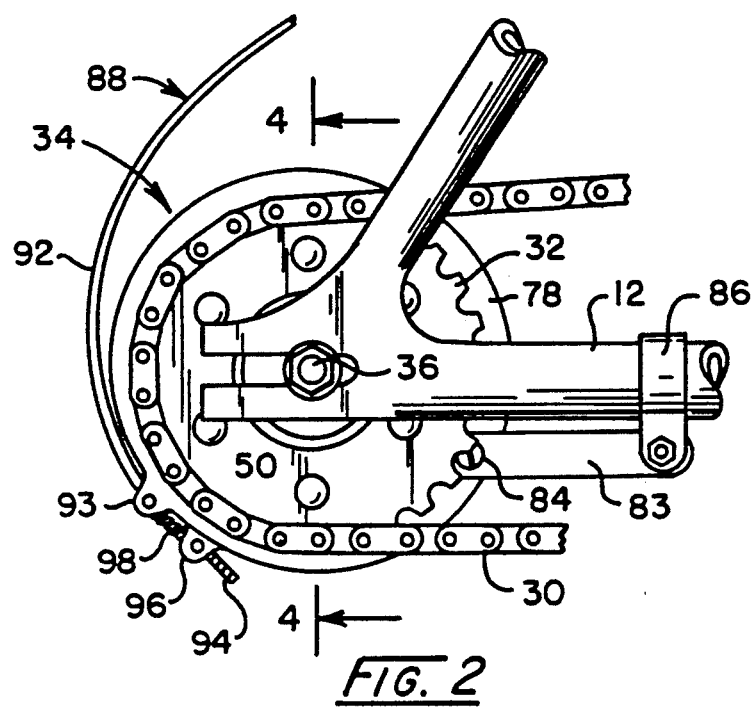
FIG. 2 is a side elevational view of the rear hub of the bicycle with the transmission associated therewith.

In the operation of this rotary phased transmission, the rotation of the sprocket 32 is transmitted to the hub 42 which rotates about a common axis provided by the axle 36. The torsional transfer of the transmission to the hub is accomplished through the hinged linkages 46, the cam followers or rollers 56 of which successively cooperate with cam undulations or recesses 100-100a. As previously indicated, six of these linkages are shown as an example but the number may vary as long as the recesses are not an even multiple of the cam-following linkages. The rollers 56 of each linkage follow the contour of the surrounding cam rings 70, and 72-74 and radial positioning of the linkages is controlled by the rollers engaging the cam rings. If the recesses 100-100a are completely closed, there will be no radial thrust movement but if they are open or partially open, there will be radial thrust movement. This movement results in an inward radial thrust movement of the links 52 to cause the ratchet pawls 60 on their inner ends to engage the ratchet teeth 62 on the hub 42 to rotate that hub on the axle in a clockwise or forward direction (FIGS. 2 and 3). Due to the number of linkages relative to the cam-follower roller receiving recesses as described above, the successive rollers 56 will be entering successive recesses at different intervals. Thus, there will be a smooth, quiet drive by the rotary phased radial thrust transmission 32 and the cam assembly may be adjusted to vary the speed ratio of the transmission.

Figure 8:
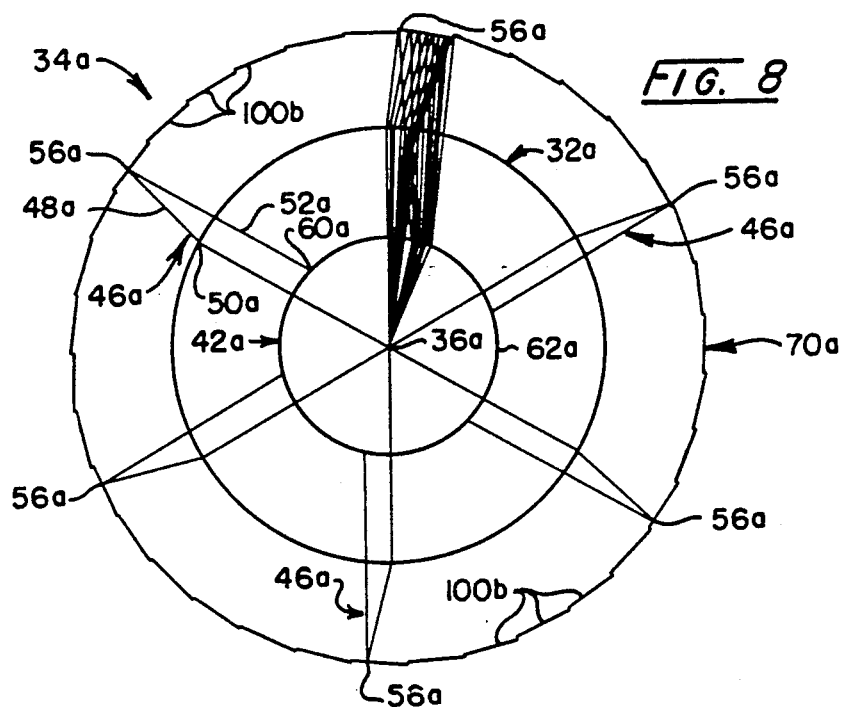
FIG. 8 is a graphical layout of this invention showing how it functions.
Figure 9:
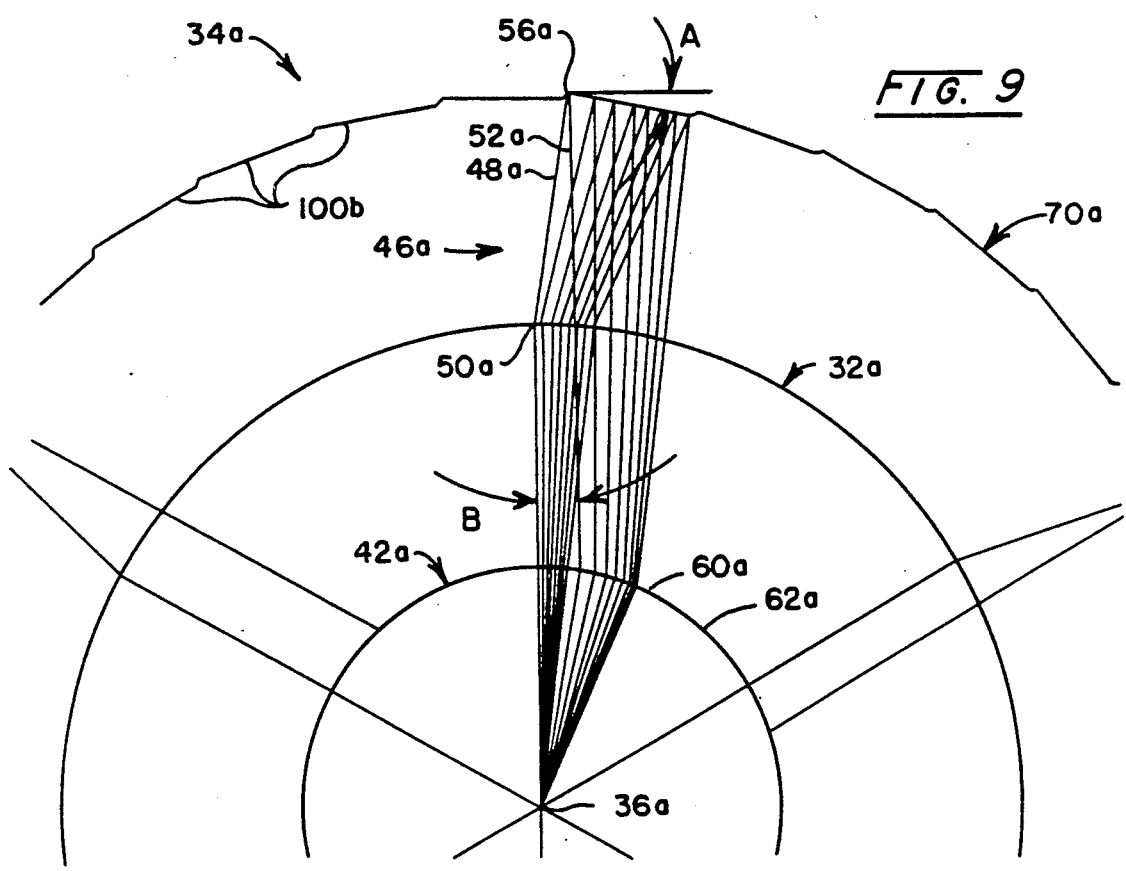
FIG. 9 is an enlarged partial view of FIG. 8.

FIGS. 8 and 9 provide a graphical layout which illustrates the theory and operation of the transmission 34a. For the sake of clarity, only one cam ring is illustrated at 70a and the cam ring undulations or recesses indicated at 100b are shown as angular instead of curved. The hub is indicated at 42a and its axis of rotation is indicated at 36a. The sprocket is indicated at 32a and the linkages are indicated at 46a with their sprocket connected links 48a pivoted to the sprocket at 50a and hinged to the thrust links 52a at hinge points 56a where the cam-followers or rollers are located. The thrust links are indicated at 52a and the pawls carried thereby are indicated at 60a in engagement with the ratchet teeth 62a on the circumference of the hub 42a. As an example, six of the angularly spaced linkages 46a are indicated. As previously stated the design of the cam ring profile is such that the number of recesses is not an even multiple of the number of roller linkages e.g. (multiple −1) or (multiple +1). In this example, thirty-five recesses 100b are indicated.

As previously described the greatest amount of transmission ratio change is possible with the cams adjusted to the position indicated in FIG. 6 which allows the rollers 56a to travel the greatest distance into the recesses 100b. When the lever 90 is shifted to adjust the cams to the other extreme, the rollers 56a travel the least distance into the recesses 100b. In FIGS. 8 and 9 the recesses 100b are indicated as completely open, thirty-five of them being indicated for cooperation with the six rollers 56a equally angularly positioned around the transmission 34a. Because of the described relationship in numbers between the rollers 56a and recesses 100b as the sprocket 32a rotates the successive rollers 56a will be located in different positions in the successive recesses 100b as indicated in FIG. 8. The thirty-five recesses 100b in the cam edge form 10.286° sprocket angles with the six cam-followers or rollers and result in 1714° of rotation for each follower. This means that each roller will be driving during 1.714° sprocket rotation. It is desirable to have the highest ratio to be associated with the deepest recess so that the first 1.714° of sprocket rotation will cause the roller to move radially so as to produce the highest ratio of thrust on the hub.

In the graphic illustration of FIGS. 8 and 9, the cam recesses 100b are indicated as being at an angle A relative to the circumference of the cam. Rotation of the sprocket 32a in a clockwise direction forces the rollers 56a to travel along the angular recesses 100b. The thrust links 52a are at a forward angle B relative to the sprocket pivots 50a. When the roller follows angle A the distance between the cam recesses 100b and the hub ratchet surface 62a decreases so as to move the hub 42a at a faster rate than the sprocket 32a. Since the angular recesses 100b in number are not evenly divisible by the number of linkages 46a, the cam-follower rollers 56a are at different locations relative to the respective recesses 100b allowing only one at a time of the linkages to produce radial thrust on the hub. Thus there is only a short thrust duration. This can be calculated by multiplying the number of linkages (6) by the number of angles A (35) and then dividing that result into 360. Thus, each roller would have a power duration of 1.714°, thirty-five times during a rotation of the sprocket.

It will be apparent from the preceding description that this invention provides a rotary phased radial thrust variable drive transmission which is located between an input driving member, such as the pedal driven sprocket of a bicycle, and an output driven member, such as the hub of a bicycle wheel which are mounted for relative rotation on a common axis, such as the axle of the rear wheel of a bicycle, The transmission includes radial thrust linkages which are carried by the input driving member for cooperating with a surrounding cam ring having a normally fixed profile for providing a radial thrust on the output driven member to cause rotation thereof. The thrust is provided by cam-followers carried by the linkages engaging the cam ring during rotation of the input member and transmitting thrust by pawls engaging a mating surface on the output driven member but this relationship can be reversed without departing from the invention. This system also can be reversed to provide a an inner cam ring surrounded by an output outer ratchet ring.

Having thus described the invention what is claimed is:

1. A rotary phased radial thrust variable drive transmission located between a rotatable input driving member and an output driven member which are mounted for relative rotation on a common axis, including radial thrust linkages carried by one of said members, and a cam unit surrounding said axis and having a selected profile, said thrust linkages carrying cam-followers for engaging said cam profile during relative rotation of said members and thrust means for engaging a mating surface on the other of said members to supply torque thereto so as to result in rotation thereof, and adjustable means for varying the profile of said cam unit.

2. A transmission according to claim 1 in which said thrust linkages are carried by the input driving member, and means for rotating said input driving member relative to said cam.

3. A transmission according to claim 1 in which each of said linkages comprises a pair of links hinged together and including a mounting link pivoted to the one of said rotatable members and a thrust link carrying said thrust means in the form of a pawl means, said mating surface being a ratchet surface on the circumference of said other member, said cam-followers being in the form of rollers, each of the rollers being carried by the linkage at its hinge.

4. A transmission according to claim 3 in which said hinged links are hinged together in V-form by a hinge pin which carries a roller, and biasing means is associated with said hinge pin to normally urge the roller carried at said hinge pin into engagement with said cam profile.

5. A transmission according to claim 4 in which each of the thrust links carries said pawl means in the form of a pivoted pawl for engaging said ratchet surface on the output driven member.

6. A transmission according to claim 5 in which the pawl is in the form of a tooth for engaging the ratchet surface formed on the circumference of said driven member, said surface ratchet comprising successive teeth around the circumference engaged by said pawl, and means for biasing said pawl into engagement with said ratchet surface.

7. A transmission according to claim 1 in which said cam profile includes recesses for receiving said cam-followers.

8. A transmission according to claim 7 in which said thrust linkages are angularly disposed around said carrying member and said cam profile includes successive angularly spaced recesses for receiving said followers.

9. A transmission according to claim 8 in which said recesses are in number relative to said linkages which is not an even multiple of said linkages.

10. A transmission according to claim 9 in which said cam unit comprises a pair of relatively rotatable cams which have complemental profiles including successive circumferentially spaced recesses which cooperate to receive the cam-followers, and means for adjusting said cams relatively from an inoperative position where the cooperating recesses are closed to different operative positions where the cooperating recesses are open to receive the cam-followers.

11. A transmission according to claim 10 in which the recesses are of angular form.

12. A transmission according to claim 10 in which the recesses are of semi-circular form and the followers are rollers.

13. A transmission according to claim 10 in which means biases the cams normally into aligning position relatively, and means for overcoming said biasing means to adjust the cams relatively.

14. A transmission according to claim 1 mounted on a bicycle which includes a frame having an axle supported thereby which rotatably carries the hub of a wheel to be driven by said transmission, said transmission having an annular housing concentric with said hub fixed to said frame so that said hub can rotate relative thereto, a driving sprocket mounted on said axle concentric thereto and rotatable thereon, said bicycle also having a driving chain system for driving said sprocket which is the said input driving member and which drives the said hub which is the said output driven member, said linkages being disposed within said housing at angularly spaced positions around said hub and adapted to transmit radial thrust under control of said cam from said sprocket to said hub to produce torque causing the hub to rotate on said axle.

15. A transmission according to claim 14 in which said linkages are carried by said sprocket and said cam is of ring form disposed in said housing concentric with said hub and its said profile consists of an inner edge with successive angularly spaced recesses for receiving said cam-followers.

16. A transmission according to claim 15 in which said recesses are in number relative to said linkages which is not an even multiple of said linkages.

17. A transmission according to claim 16 in which said cam comprises a pair of relatively rotatable cam rings rotatably mounted in said housing concentric with said hub and having complemental profiles with said recesses formed at circumferentially spaced intervals, and means for adjusting said cam rings angularly relative to each other and to said hub so that the recesses of the respective cam rings are in or out of alignment.

18. A transmission according to claim 17 in which biasing means is provided between the transmission housing and one of the cam rings to rotate the rings relatively to position their respective recesses in alignment.

19. A transmission according to claim 18 in which the bicycle frame carries a cable unit connected to said biasing means to overcome it to rotate one of the cam rings relative to the other.

20. A transmission according to claim 19 in which the cam is in the form of three axially spaced cam rings all having identical recesses, and including a pair of outer rings fixed to said housing and an inner ring which is connected to said adjusting means.

21. A transmission according to claim 20 in which each of said linkages comprises a pair of links hinged together and including a mounting link pivoted to an adjacent face of said sprocket and a thrust link carrying said pawl means, said cam-followers being in the form of rollers, each of the rollers being carried by the linkage at its hinge.

22. A transmission according to claim 21 in which said hinged links are hinged together in V-form by a hinge pin which carries a roller, and biasing means is associated with said hinge pin to normally urge the roller carried at said hinge pin into engagement with said cam.

23. A transmission according to claim 22 in which each of the thrust links carries said thrust means in the form of a pivoted pawl for engaging said hub which has a ratchet surface formed on the circumference thereof.

24. A transmission according to claim 23 in which each of the recesses in said cam rings is of semi-circular form.

* * * * *